(12) United States Patent
Margerum et al.

(10) Patent No.: US 7,841,298 B2
(45) Date of Patent: Nov. 30, 2010

(54) WALL MOUNTABLE AQUARIUM OR TERRARIUM

(76) Inventors: Narda Margerum, 5850 S. US Route 31, Peru, IN (US) 46970; Linda R. McCoy, 2934 W. 500 S, Peru, IN (US) 46870

( * ) Notice: Subject to any disclaimer, the term of this patent is extended or adjusted under 35 U.S.C. 154(b) by 0 days.

(21) Appl. No.: 12/729,039

(22) Filed: Mar. 22, 2010

(65) Prior Publication Data
US 2010/0206239 A1 Aug. 19, 2010

Related U.S. Application Data

(63) Continuation of application No. 11/800,699, filed on May 7, 2007, now abandoned, which is a continuation-in-part of application No. 11/269,171, filed on Nov. 8, 2005, now abandoned.

(60) Provisional application No. 60/626,158, filed on Nov. 8, 2004.

(51) Int. Cl.
*A01K 63/00* (2006.01)
(52) U.S. Cl. .................................................. 119/257
(58) Field of Classification Search .............. 119/257, 119/245, 247, 253, 269
See application file for complete search history.

(56) References Cited

U.S. PATENT DOCUMENTS

| 475,404 | A | * | 5/1892 | Lochmann | 119/257 |
|---|---|---|---|---|---|
| 2,595,085 | A | * | 4/1952 | Kuriyama | 362/101 |
| 2,814,895 | A | * | 12/1957 | Flam | 40/538 |
| 3,276,428 | A | * | 10/1966 | Burch | 119/257 |
| 3,735,738 | A | * | 5/1973 | Lake | 119/257 |
| 4,136,638 | A | * | 1/1979 | Fedor | 119/257 |
| 4,798,170 | A | * | 1/1989 | DePiazzy | 119/61.57 |
| 5,101,989 | A | * | 4/1992 | Jones | 211/94.01 |
| 5,109,993 | A | * | 5/1992 | Hutchison | 211/87.01 |
| 5,144,912 | A | * | 9/1992 | Hammett et al. | 119/61.57 |
| 5,185,971 | A | * | 2/1993 | Johnson, Jr. | 52/36.6 |
| 5,435,270 | A | * | 7/1995 | Newman | 119/257 |
| 5,467,739 | A | * | 11/1995 | Boschert | 119/247 |
| 5,878,694 | A | * | 3/1999 | Irwin | 119/452 |
| 6,119,878 | A | * | 9/2000 | Zen | 211/94.01 |
| 6,415,739 | B1 | * | 7/2002 | Orendorff et al. | 119/248 |
| 7,086,542 | B2 | * | 8/2006 | Tomonari et al. | 211/94.01 |
| 2005/0051107 | A1 | * | 3/2005 | Hsieh et al. | 119/257 |
| 2005/0178339 | A1 | * | 8/2005 | Choe | 119/257 |

* cited by examiner

*Primary Examiner*—Son T. Nguyen
(74) *Attorney, Agent, or Firm*—Bruce J. Bowman

(57) ABSTRACT

A wall mountable tank system for holding live flora or fauna includes an integrally formed tank including a rear panel, a bottom panel, and at least one of a front panel, first side panel, and second side panel. The panels define a tank interior for containing the flora or fauna. The rear panel includes a mounting portion having a receiving groove. A mounting member capable of being fixedly coupled to a vertical mounting surface is provided. The mounting member includes a tongue portion receivable in the receiving groove for engaging the mounting member to the tank.

20 Claims, 10 Drawing Sheets

WALL MOUNTABLE AQUARIUM OR TERRARIUM

RELATED APPLICATIONS/PRIORITY STATEMENT

The present application is a continuation of and claims the benefit and priority to currently pending Margerum and McCoy, U.S. patent application Ser. No. 11/800,699 filed on May 7, 2007 now abandoned which was a continuation-in-part of Margerum and McCoy, U.S. patent application Ser. No. 11/269,171 filed on Nov. 8, 2005, now abandoned, which itself claims the benefit and priority of Margerum and McCoy, U.S. Provisional Application Ser. No. 60/626,158 filed on Nov. 8, 2004, now expired. The above three applications are incorporated herein by reference.

BACKGROUND OF THE INVENTION

1. Field of the Invention

The present invention relates to containers for containing flora and fauna, and more particularly to a wall mountable container that is preferably employed as an aquarium for holding marine life-type fauna, such as tropical fish, and associated underwater flora; or else as a terrarium for holding air breathing fauna, such as lizards, frogs and snakes and/or associated flora, or else as an ant farm type terrarium.

2. Background Information

Along with providing transparent walls, an aquarium manufacturer must take care to ensure that the tank is made to be sturdy, for when the tank is used as an aquarium, it will hold water. The weight of water exerts significant pressure against the side walls of the aquarium, thereby requiring the walls to be strong enough to withstand this pressure. Additionally, when separate panels are joined together to form the aquarium walls, the seals between the panels must be made to be both strong and leak proof, to ensure that the water within the tank does not leak out through the seams.

Conventionally, aquariums and terrariums are designed to be placed on a flat horizontal surface, such as the top of a cabinet or table, or the shelf of a bookcase. However, some prior known aquariums have been invented and exist that are designed to be used on vertical surfaces, such as a wall or the like. Examples of such wall-mounted aquariums are shown in Youn, U.S. Pat. No. 6,321,684 and Waldman, U.S. Pat. No. 4,967,694.

Along with the tank, a typical aquarium or terrarium will often include one or more accessories that are used in connection with the tank. One such accessory is a light assembly for illuminating the interior of the tank. It has been found by users of aquariums that a light helps to better illuminate the flora and fauna within the tank, and thus provides a more pleasing aesthetic appearance to the terrarium or aquarium, along with facilitating the user in viewing the flora or fauna contained within the tank. Additionally, aquariums will often require filters for filtering the water within an aquarium. Filters are used to filter out material such as biological decay material, which if left unfiltered and remained in the tank, could be harmful to the aquatic life within the tank. Light assemblies and filters are usually electrically powered, and include cords and plugs to connect the lights and filters to a source of AC power.

Although lights and filters are valuable, and some cases necessary to the proper operation of an aquarium or other tank containing flora or fauna, light assemblies and filters often have an appearance that detracts from the overall aesthetics of the aquarium. As such, it would be helpful to provide a mechanism that helps to "hide" the light filter assembly and associated cords to thereby improve the aesthetic appearance of the aquarium.

Although the patents mentioned above no doubt disclose devices that perform their function in a workman-like manner, room for improvement exists. In particular, room for improvement exists in providing a tank system for an aquarium or terrarium that includes a mounting system for mounting the tank onto a vertical wall that facilitates easy placement of the aquarium on the wall, and easy removal of the tank from the wall.

Another object of the present invention is to provide a tank system that is placeable upon a vertical mounting surface such as a wall that has an enhanced aesthetic appearance that is achieved, at least in part, by providing a frame that is capable of helping to conceal from view tank accessories, such as light assemblies and filter assemblies.

Preferably, the frame is designed to be easily attachable to, and removable from the tank so that the user can change out a particular frame for another frame. This interchangeability of the frames permits the user to quickly alter the aesthetics of the device, and the room in which it is contained.

SUMMARY OF THE INVENTION

A wall mountable tank system for holding live flora or fauna includes a tank including a rear panel, a bottom panel, and at least one of a front panel, first side panel, and second side panel. The panels define a tank interior for containing the flora or fauna. The rear panel includes a mounting portion having a receiving groove. A mounting member capable of being fixedly coupled to a vertical mounting surface is provided. The mounting member includes a tongue portion receivable in the receiving groove for engaging the mounting member to the tank.

In a preferred embodiment of the present invention, the groove includes at least one slot, and the mounting member includes at least one tab that is sized and positioned for insertion into the slot to resist lateral movement of the tank on the mounting member. The mounting member can comprise an elongated strap-like member having a plurality of fastener-receiving apertures through which fasteners can pass for securing the mounting member to the vertical surface.

Additionally, the rear panel of the tank can be formed to extend above the upper edge of the front panel to form an upwardly extending mounting portion that contains the mounting portion and receiving groove. The light assembly can be coupled to the upwardly extending mounting portion for illuminating the interior of the tank. The light assembly preferably includes a mounting bracket for mounting the lighting assembly to the upwardly extending mounting portion.

Further, a picture frame-shaped interchangeable frame can be provided that is capable of being coupled to the tank. The frame preferably includes at least a first leg that is positionable in front of the tank, and is wide enough to conceal the light assembly, when the light assembly is coupled to the tank.

In accordance with another embodiment of the present invention, a wall mountable tank system is provided for holding flora and fauna. The tank system comprises a tank including a rear panel, a bottom panel, and at least one of a front panel, a first side panel and a second side panel. The panels define a tank interior for containing the flora or fauna. A mounting member is provided that is capable of being fixedly coupled to a vertical mounting surface for mounting the tank to the vertical mounting surface. Additionally, a picture frame-shaped frame is capable of being interchangeably coupled to the tank.

One feature of the present invention is that it includes a mounting member that includes a tongue portion that is receivable on a receiving groove of a rear panel of the tank. This feature has the advantage of making the tank removeably detachable from the wall, while providing a secure attachment between the tank and the wall. Preferably, the groove includes at least one slot and the mounting member includes at least one tab that is sized and positioned for insertion into the slot. This feature has the advantage of providing lateral stability to the tank, to prevent the tank from moving sideways on the mounting member.

Another feature of the present invention is that it includes a picture frame-shaped interchangeable frame that is capable of being coupled to the tank, with the frame including a first leg positionable in front of the upwardly extending mounting portion of the rear panel.

This feature has the advantage of enhancing the aesthetics of the device. Not only does the interchangeable frame provide a "picture-like" appearance to the tank, but the width of the frame helps to hide aesthetically unpleasing elements such as the light assembly and the filter assembly.

Another feature of the present invention is that it includes a picture holder for holding a picture flush against the rear panel of the tank. This feature has the advantage of also improving the appearance of the device, by permitting the user to employ a picture to serve as a background for the tank. This picture can be any picture of the user's choosing or desire, and can include such things as a picture of the user's friends and family; or alternately, of an underwater scene to blend in with the habitat created by the flora and/or fauna contained within the interior of the tank.

These and other features and advantages of the present invention will become apparent to one skilled in the art upon a review of the drawings and detailed description of the preferred embodiment set forth below that represents the best mode of practicing the invention perceived presently by the applicant.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein.

Like reference numerals indicate the same or similar parts throughout the several figures.

A description of the features, functions and/or configuration of the components depicted in the various figures will now be presented. It should be appreciated that not all of the features of the components of the figures are necessarily described. Some of these non-discussed features, if any, as well as discussed features are inherent from the figures. Other non discussed features may be inherent in component geometry and/or configuration.

DETAILED DESCRIPTION OF EMBODIMENTS OF THE INVENTION

Figure 1:
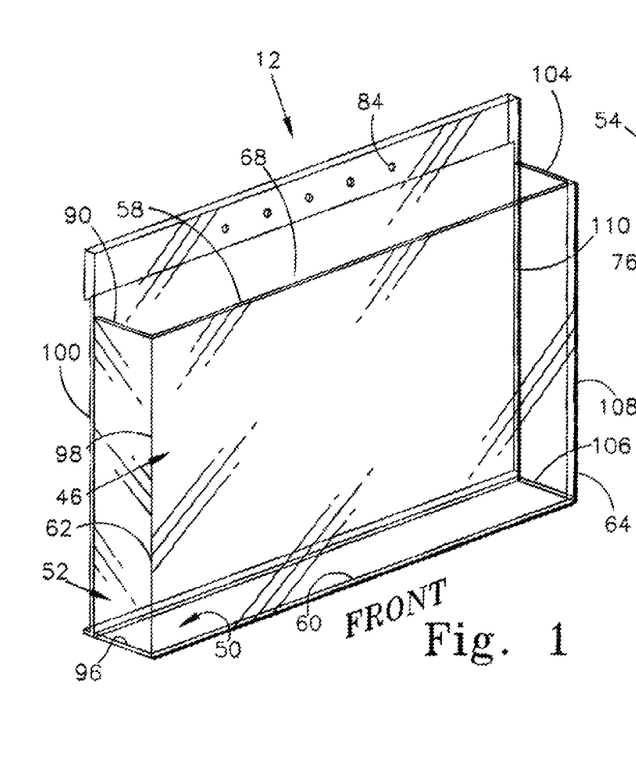
FIG. 1 is a front view of the tank of the tank system of the present invention.
Figure 1A:
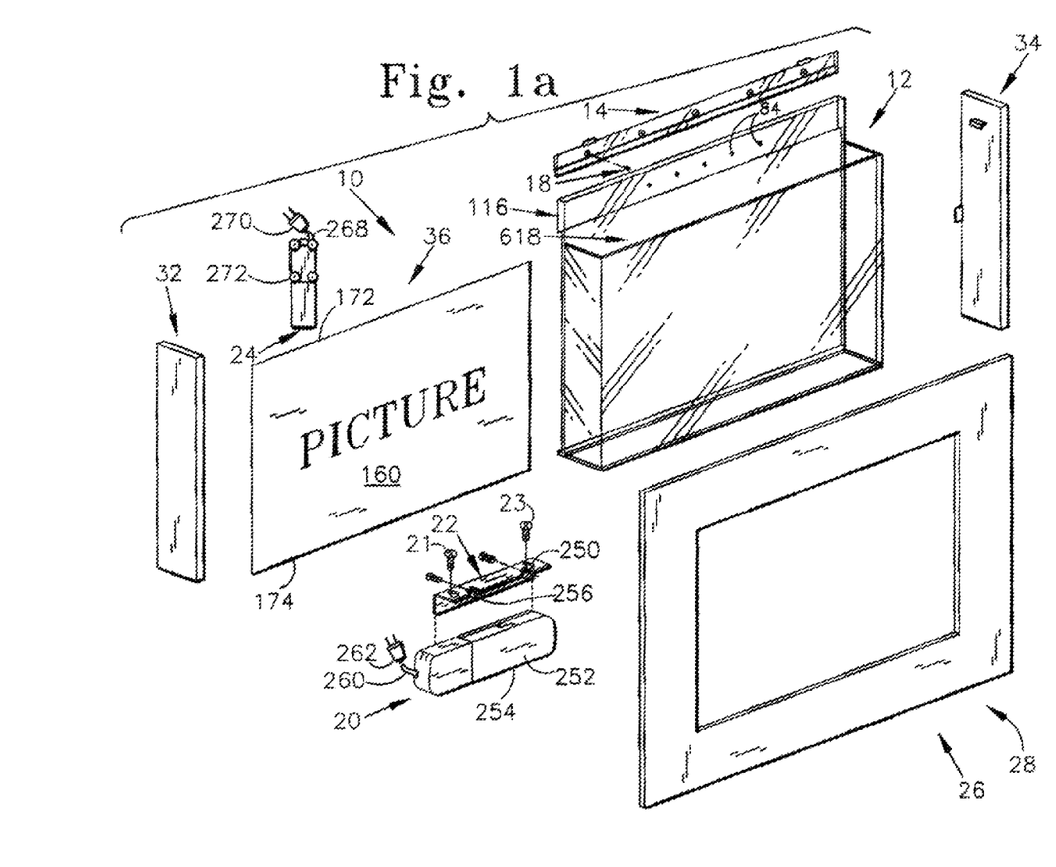
FIG. 1A is a perspective, exploded view of the tank system of the present invention.

A wall mountable tank system 10 of the type that is well adapted for serving either as an aquarium or terrarium is shown in the figures, and particularly in FIG. 1A. As will be well known to those skilled in the art, similar structures can often serve a dual purpose or either an aquarium or a terrarium, with the major difference often being the type of flora and fauna placed within the particular structure, rather than of the structure itself. An aquarium typically contains water and aquatic life such as fish and aquatic plants. By contrast, a terrarium usually is not filled with water (although it may contain a small "pond" of water), and rather includes a dry land portion. The flora contained within a terrarium tend to be those type of flora that thrive in an air (rather than a water) environment. Similarly, the fauna that are typically within a terrarium include such things as reptiles, mammals, snakes, amphibians, and the like that are primarily air breathing, or at least breathe air through a large part of their existence. As discussed above, a terrarium may include an aquatic portion along with a land portion for amphibious creatures such as frogs, or creatures such as alligators that enjoy both the water and the land environments.

As such, in summary, the difference between an aquarium and a terrarium is largely a function of the flora and fauna placed therein, rather than in the significant differences in the structure. However, it will also be appreciated that an aquarium must generally be water-tight if it is to hold a quantity of water, wherein a terrarium need not be water-tight, as it may not hold such a quantity of water.

One type of terrarium for which the tank system of the present invention can serve is an ant farm. If used as an ant farm, the tank system 10 should be additionally equipped with a top (not shown) to enclose the otherwise open top of the tank 12, to help prevent the ants from escaping from the interior of the tank.

The wall mountable tank system 10 of the present invention includes a plurality of components that make up the system. The major components include a tank 12, and a mounting member 14, for mounting the tank 12 to a vertical mounting surface VMS (FIG. 11) such as the vertical mounting surface of a wall W.

Returning now to FIG. 1, a plurality of fasteners 18, such as screws, molly bolts, and the like, are provided for fastening the mounting member to the wall W. A light member 20 can be affixed to the tank 12 through a bracket 22 arrangement. A first set of fasteners 21 are provided for fastening the bracket onto the casing of the light member 20, and a second set of fasteners 23 are provided for fastening the bracket 22 to the tank 12, and preferably, the mounting portion of the rear panel of the tank 12.

A filter 24 is also provided for filtering water that is contained within the tank, when the interior of the tank 12 contains water. The filter 24 filters the water to remove harmful impurities, such as decaying animal matter and the like, and also to aerate water to help maintain an appropriate oxygen level in the water.

A frame system 26 is provided for enhancing the aesthetic appearance of the tank system, by providing a frame around the tank 12, so that the tank 12 takes on a more "wall hanging picture"-like appearance. The frame system 26 includes a picture frame-like frame 28 that is placeable adjacent to the front panel of the tank 12. First and second side frames 32, 34 are placeable adjacent to the respective first and second side panels of the tank. In use, the first and second side frames 32, 34 are not necessarily visible from the front of the tank, as they tend to be hidden by the first and second side legs of the picture frame 28. However, even when hidden, the first and second side frames 32, 34 serve a useful function of preventing stray light from entering through the side panels of the tank 12, to thereby provide a better and more pleasingly aesthetic appearance of the interior of the tank.

A sheet-like decorative member, such as a picture 36 is provided for providing a background picture for the tank 12. The picture 36 has a front surface upon which a picture can be printed, and is sized and shaped to have a length and width generally similar to that of the back panel of the tank 12, and to fit flushly against the rear surface of the back panel of the tank 12.

Figure 2:
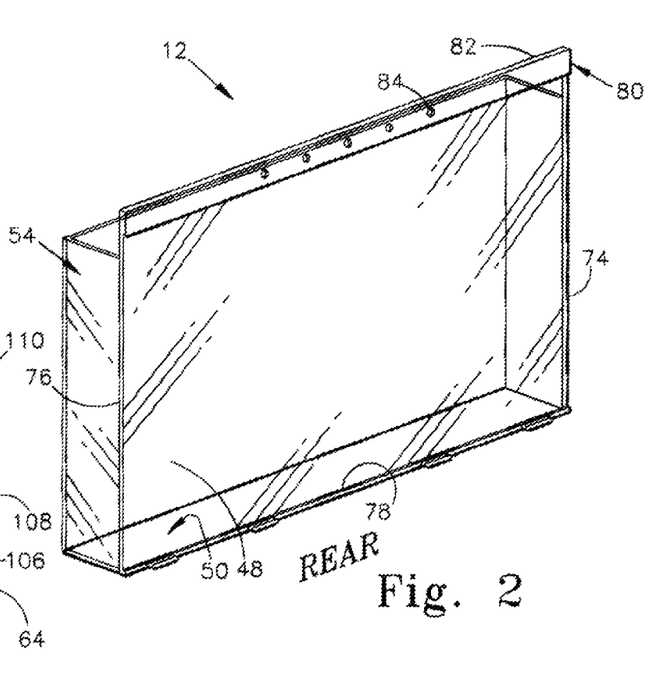
FIG. 2 is a rear perspective view of the tank of the tank system of the present invention.
Figures 3, 4:
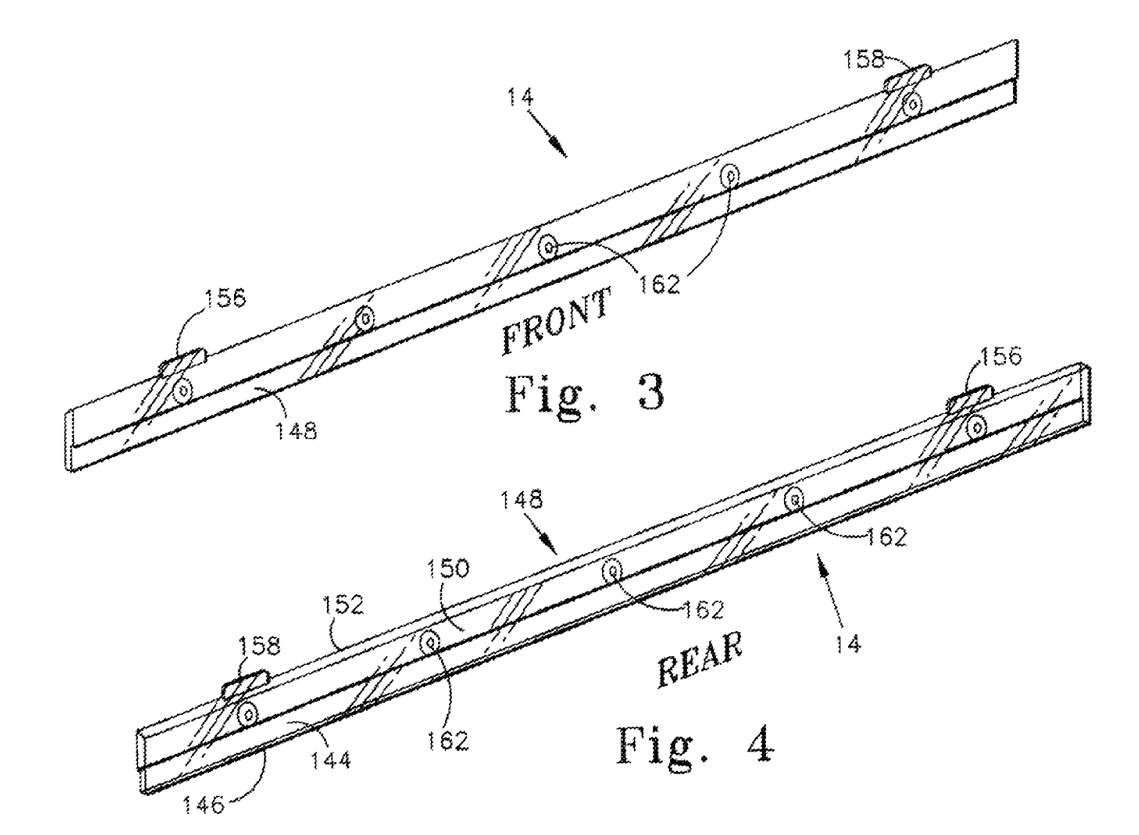
FIG. 3 is a front perspective view of a mounting member of the present invention.
FIG. 4 is a rear perspective view of the mounting member of the present invention.

The rectangularly cuboid tank 12 is best shown in FIGS. 1A, 1 and 2, as including a generally planar sheet-like front panel 46, a rear panel 48, a bottom panel 50, a first side panel 52 and a second side panel 54. The front and rear panels 46, 48 are placed in an opposed relationship; as are the first and second side panels 52, 54. There is no top panel to be placed in an opposing relationship with bottom 50, as the top is left open.

The front panel 46 includes an upper lip 58, a lower edge 60, a first side edge 62 and a second side edge 64. The upper lip 50 mates with no other side panel since the top is open. However, the lower edge 60, first side edge 62, and second side edge 64 mate with adjoining panels 50, 52, 54, respectively.

The tank may be made in one piece through an injection molding process. If such is the case, the lower edge 60, first side edge 62 and second side edge 64 actually would not consist of edges, as they would consist of elongated creases, where one panel meets an adjoining panel.

Figure 13:
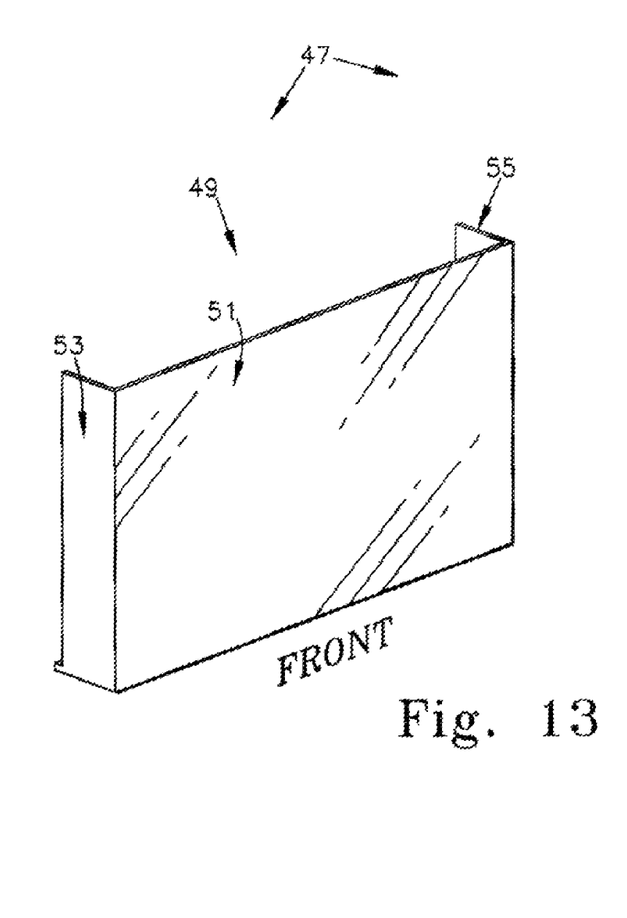
FIG. 13 is a front view of an alternate embodiment construction of the tank of the present invention.
Figure 14:
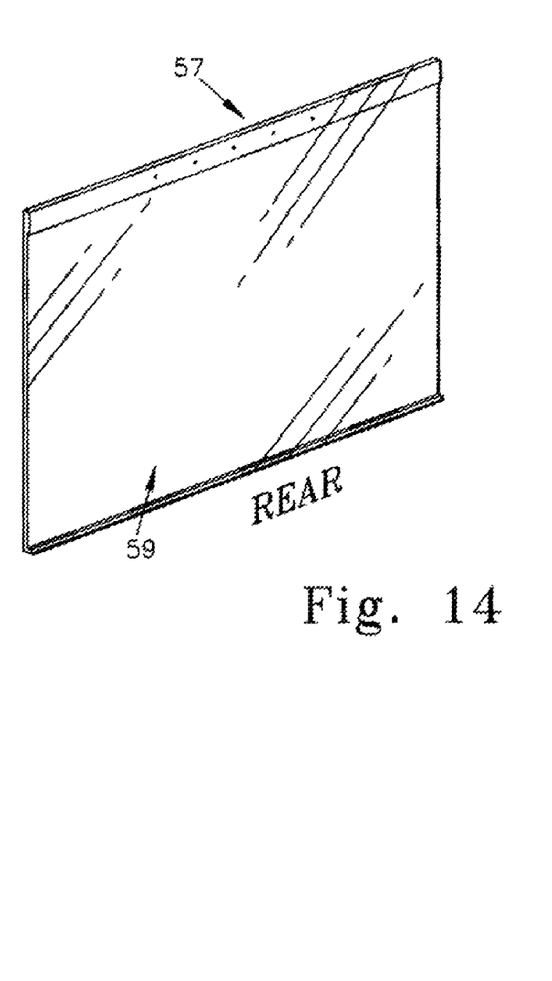
FIG. 14 is a front perspective view of an alternate embodiment rear panel construction of the present invention.

Alternately, the tank 12 can be made from flat panels that are joined together with a sealant. In such case, the sealant placed along the edges should be strong enough to stand the forces imposed by the interior 68 of the container that is defined by the interior surfaces of the front panel 46, rear panel 48, bottom panel 50, first side panel 52, and second side panel 54 is filled with a fluid such as water. An alternate embodiment construction is shown in FIGS. 13 and 14, wherein the tank 47 is constructed of two members, a front member 49 that includes a front panel 51, a first side member 53 and a second side member 55; and a second member 57 that comprises the rear panel 59.

Returning back to FIGS. 1A, 1, and 2, the front panel 46 of tank 12 also includes a lower ridge 60 that is disposed adjacent to, and connects with the bottom panel 50, and a second side edge 64, that is coupled to and disposed adjacent to the second side panel 54.

Figure 9:
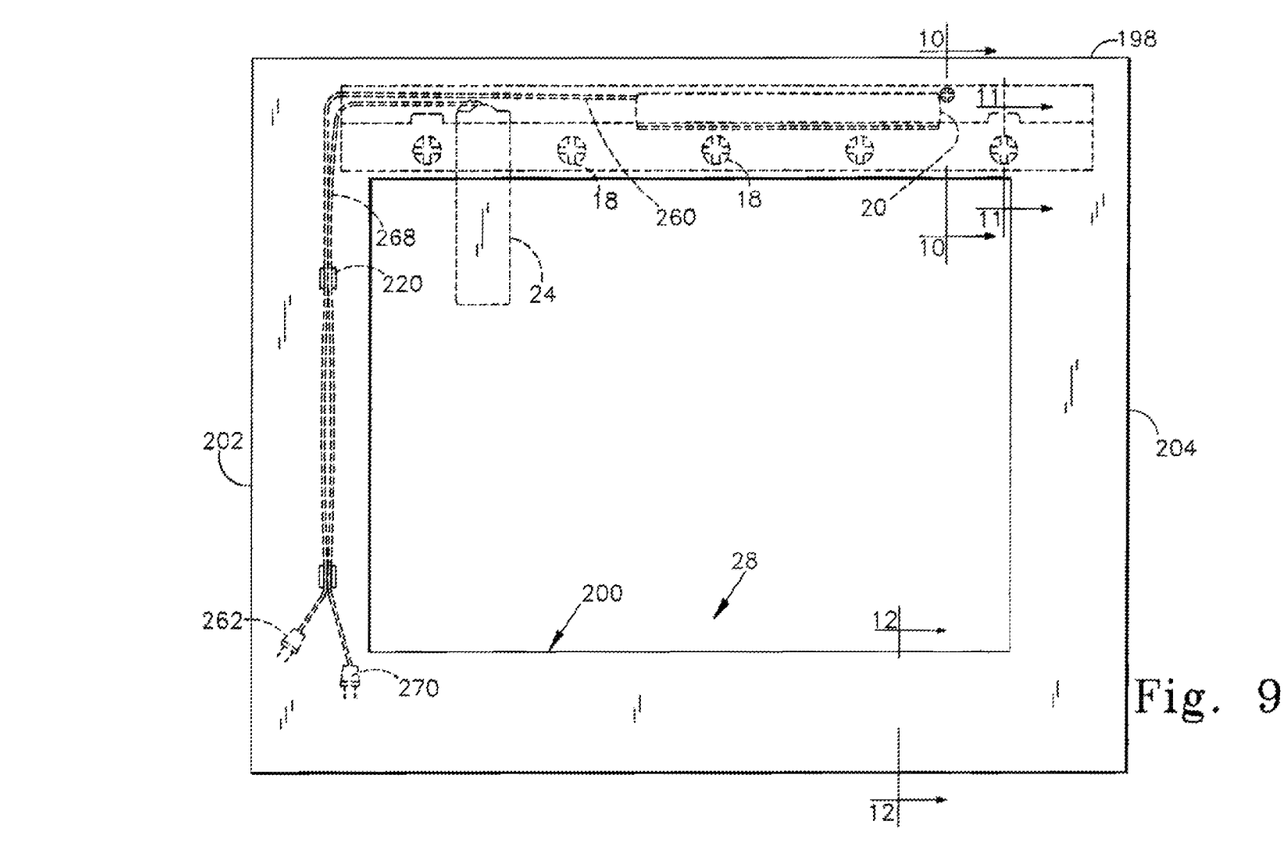
FIG. 9 is a front elevational view of the tank system of the present invention, showing several components of the invention in phantom.

The rear panel 48 is disposed in a plane parallel with the front panel 46. The rear panel 48 includes a first side edge 74 that is connected to the first side panel 52, and a second side edge 76, that is connected to the second side panel 104. The bottom edge 78 of the rear panel 48 is coupled to the bottom panel 50. The rear panel 48 also includes a mounting portion 80 that extends upwardly at a level above the top lip 58 of the front panel 46. The mounting portion 80 extends generally across the entire width of the rear panel 48, and is integrally and unitarily formed therewith. The mounting portion 80 includes a plurality of apertures 84 through which fasteners can pass. As best shown in FIG. 9, the apertures 84 of the mounting portion 80 are sized and positioned for receiving fasteners 23 that can also pass through the bracket 22 of the light 20 for fastening the light assembly 20 to the mounting portion 80, and hence, the tank 12.

The first side panel 52 is disposed in a plane that is generally perpendicular to the planes in which each of the front 46 and rear 48 panels reside, and is also disposed in a plane that is perpendicular to the plane in which the bottom panel 50 is disposed. The first side panel 52 includes a top lip 90 that connects with nothing due to the open top nature of the tank 12. The bottom edge 96 of the side panel 52 is coupled to the bottom panel 50. First side edge 98 of the first side panel 92 is coupled to the first side edge 62 of the front panel 46, and the second side edge 100 of the first side panel 52 is coupled to the first side edge 74 of the rear panel 48.

The second side panel 54 configured generally similarly to, and is sized and shaped identically to the first side panel 52. The second side panel 54 is disposed in a plane generally parallel to the plane in which the first side panel 52 is disposed. The second side panel 54 includes a first side edge 108 that is mated to the second side edge 64 of the front panel 46; and a second side edge 110 that is mated to the second side edge 76 of the rear panel 48. The second side panel 54 also includes a top lip 104 that connects to nothing due to the open top nature of the tank 12.

Figure 10:
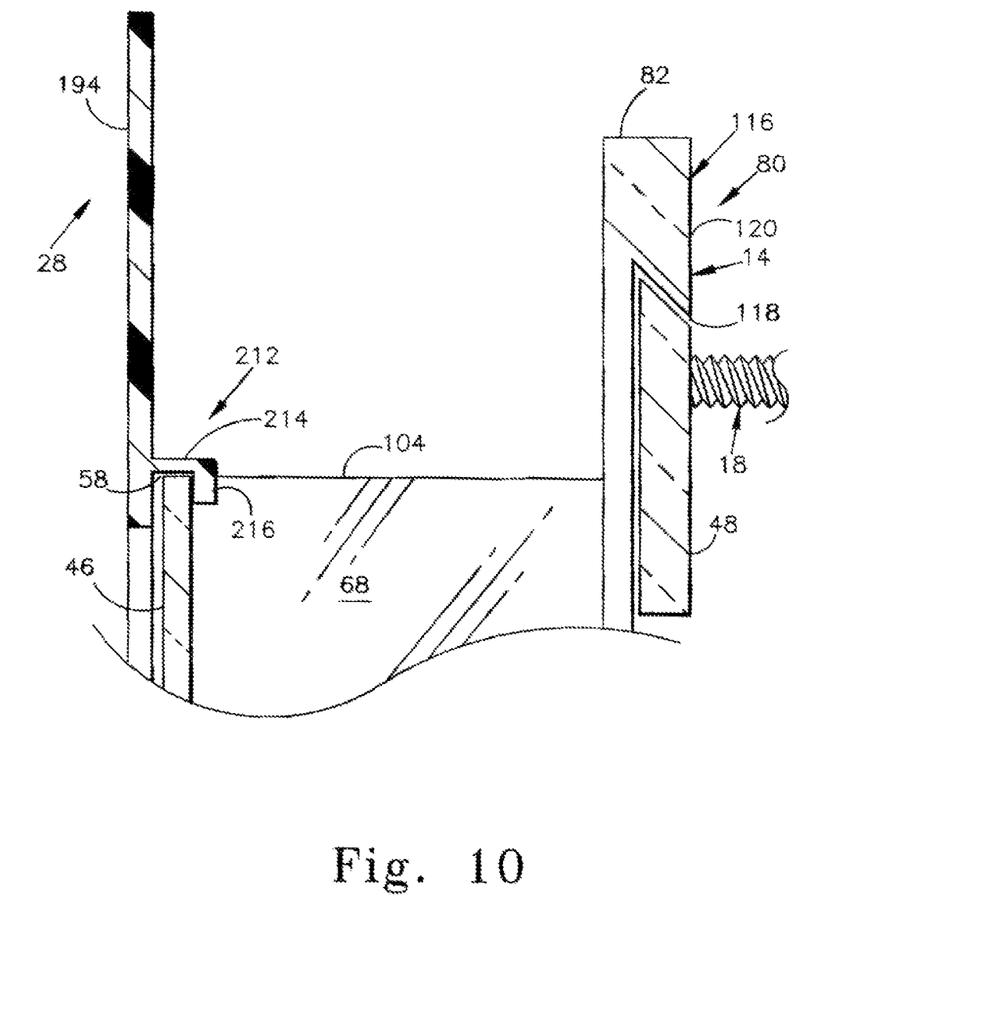
FIG. 10 is a greatly enlarged sectional view taken generally along lines 10-10 of FIG. 9.
Figures 11, 12:
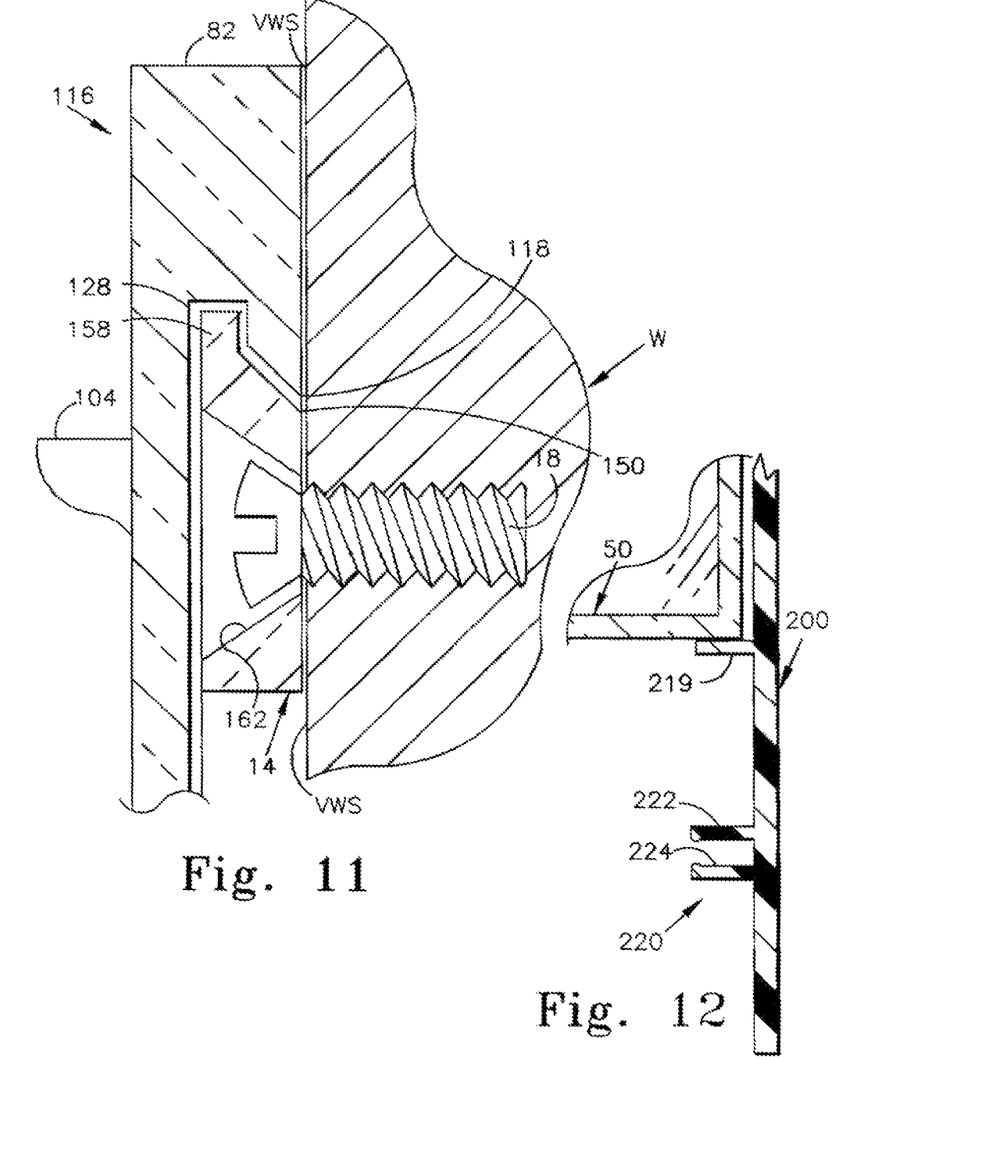
FIG. 11 is a greatly enlarged sectional view taken along lines 11-11 of FIG. 9.
FIG. 12 is a greatly enlarged sectional view, taken along lines 12-12 of FIG. 9.

The mounting portion 80 of the rear panel 48 includes a thickened portion 116 that is disposed adjacent to the top edge 82 of the mounting portion 80. The thickened portion 116 has a thickness measured in a direction T (FIG. 10) that is preferably about twice the general thickness of the majority of the rear panel 48. The rear surface 120 of the thickened portion terminates in a downwardly opening beveled groove 118. The beveled groove 118 opens downwardly, and is provided for receiving the beveled tongue of the mounting member 114. As best shown in FIG. 11, a pair of tab-receiving slots 128 is formed to extend upwardly from the beveled groove 118, and are disposed adjacent to the beveled groove 118.

The tab receiving slots 128 are sized and positioned for receiving tabs that are formed on the tongue portion of the mounting member, for resisting lateral movement of the tank 12 on the mounting member. When the tabs are inserted into the tab-receiving slots 128 of the mounting portion 116, the mounting member 14 and tank 12 are locked into position, so that they can not move laterally relative to each other, which thereby helps to hold the tank 12 in the proper lateral position on the mounting member 14, and keeps the tank from being inadvertently removed from the mounting member 14.

An elongated strap or ruler-shaped mounting member 14 is best shown in FIGS. 1, 3, 4, 10, 11 and 12A. As best shown in FIG. 11, the mounting member is provided for mounting the tank 46 onto a vertically-extending surface such as a vertical wall surface VWS of a wall W. The mounting member 14 includes a front surface 142 that is disposed adjacent to, and in an opposed relation to, the rear surface of the rear panel 48; and a front surface 144. The rear surface 144 is disposed adjacent to, and in an opposed relation to the vertical wall surface VWS of the wall W, to which the tank 46 is attached.

The wall engaging rear surface 144 terminates at its lower portion in a bottom edge 146 of the mounting member 14. The top portion of the mounting member 148 includes a tongue portion 146 that includes a beveled rear facing surface 150 that is sized and configured for engaging the beveled groove 118 of the mounting portion 116 of the rear panel 48 of the tank 12. The beveled rear surface 150 of the tongue portion 148 terminates in a knife-like top edge 152.

A first 156 and a second 158 upwardly extending tab members extend upwardly from the top edge 152, and are sized, positioned, and configured for being inserted within the tab-receiving slots 128 that are formed as a part of the mounting portion 116 of the rear panel 48 of the tank 12. When the upwardly extending tab members 156, 158 are inserted within the first and second slots 128, the mounting member 14 and tank 12 are prevented from moving laterally with respect to each other because of such engagement. The mounting member 14 also includes a plurality of apertures, here shown as five apertures 162. The apertures 162 are sized and positioned for receiving fasteners, such as molly bolts or wall screw-like fasteners 18, for fastening and permanently affixing the mounting member 14 to the wall W.

It will be appreciated that no fasteners extend between the tank 12 and the mounting member 14. Because of a lack of fasteners, the tank 12 and the mounting member 14 can be readily engaged to and disengaged from each other. To mount the tank 12 on the mounting member 14, the mounting portion 80 of the rear panel 48 is placed above the top edge 152 of the mounting member 14. The tank is then lowered vertically so that the upwardly extending tabs 156, 158 become inserted into the tab receiving slots 128. The tank 12 is continued to be lowered until the beveled upper surface 150 of the tongue portion of the mounting member 14 engages the beveled downwardly facing surface 118 of the mounting portion 80 of the rear panel 48 of the tank. When this occurs, the user's hands can be removed from the tank 12, and the tank 14 will remain fixed on the wall through the engagement of the mounting member 14 and the mounting portion 80 of the tank 12.

To remove the tank 12 from its engagement with the mounting member 14 (and hence the wall W), the above procedure is reversed. In particular, the tank 12 is lifted upwardly to disengage the downwardly extending beveled surface 118 and tab engaging slots 128, of the tank 12 with the beveled surface 150 of the tongue portion of the mounting member 14 and the first and second tabs 156, 158 of the mounting member 14. Once the tank 12 has been moved upwardly far enough so that there is lateral clearance between tank 12 and the upwardly extending tabs 156 and 158, the tank 12 can then be moved laterally away from the wall and to wherever the user so desires to move the tank 12.

Figure 12A:
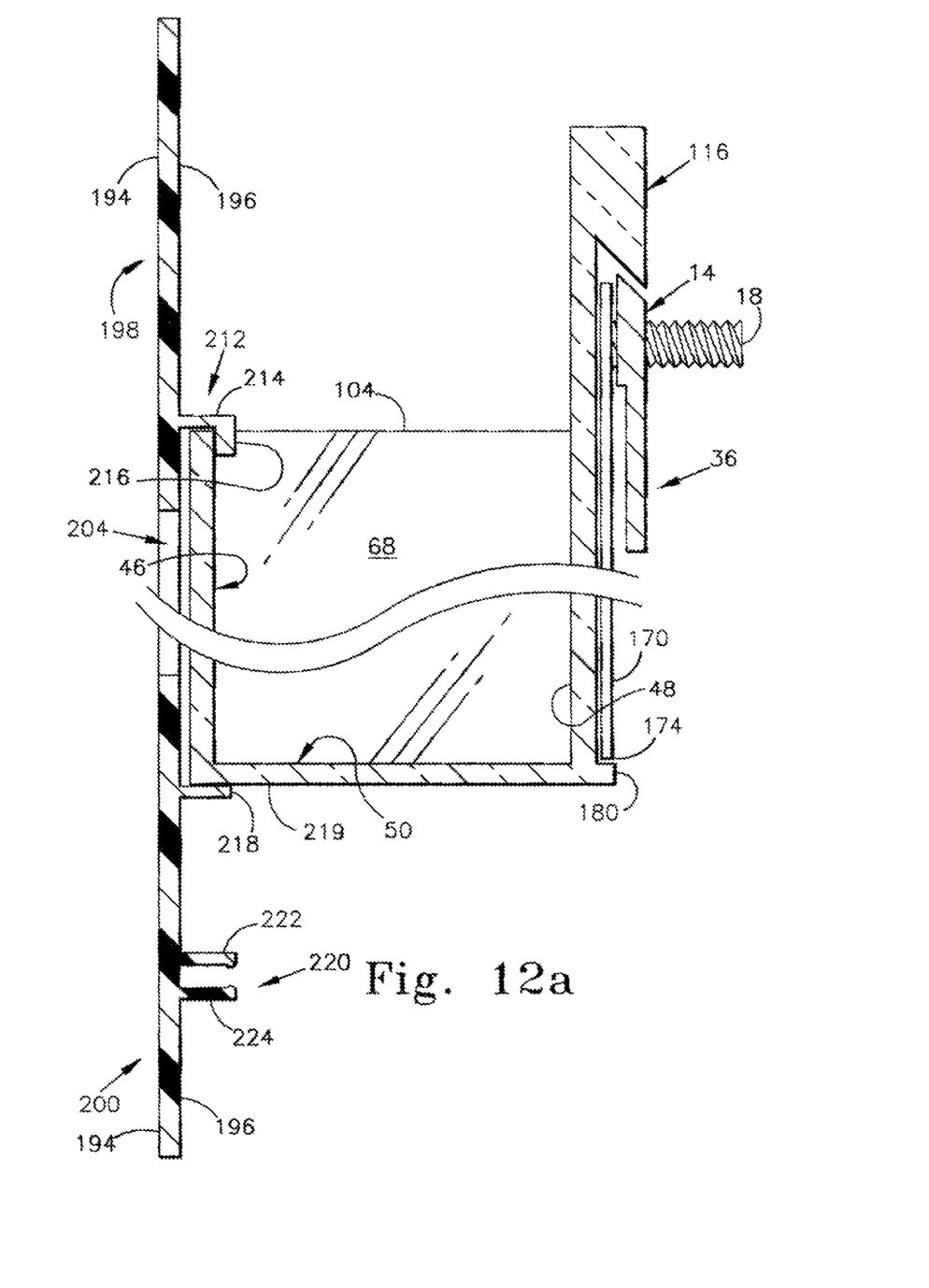
FIG. 12A is a sectional view, greatly enlarged and with a discontinuous space, of a tank system of the present invention.

As best shown in FIGS. 1A and 12A, a picture 36 can be affixed to the tank. In particular, a decorative member such as picture 36 is shown in FIG. 1A as having a front surface 168, a rear surface 170, a top edge 172 and a lower edge 174. As best shown in FIG. 12A, the picture 36 is mounted onto the tank 12, by placing the front surface 168 of the picture flush to the rear surface of the rear panel 48. Additionally, the top portion of the picture 36 adjacent to the top edge 172 is sandwiched between the rearwardly facing surface of the rear panel 48, and the forwardly facing surface 142 of the mounting member 14 to both position the picture 36 in its proper place, and to hold the picture 36 in place. Aiding in the holding of the picture 36 in its appropriate place is a laterally extending leg 180 that is disposed generally co-planarly with the bottom panel 50. This laterally extending leg 180 serves as a base for supporting the lower edge 174 of the picture to also help maintain it in position against the rearwardly facing surface of the rear panel member 48.

Figures 5, 6:
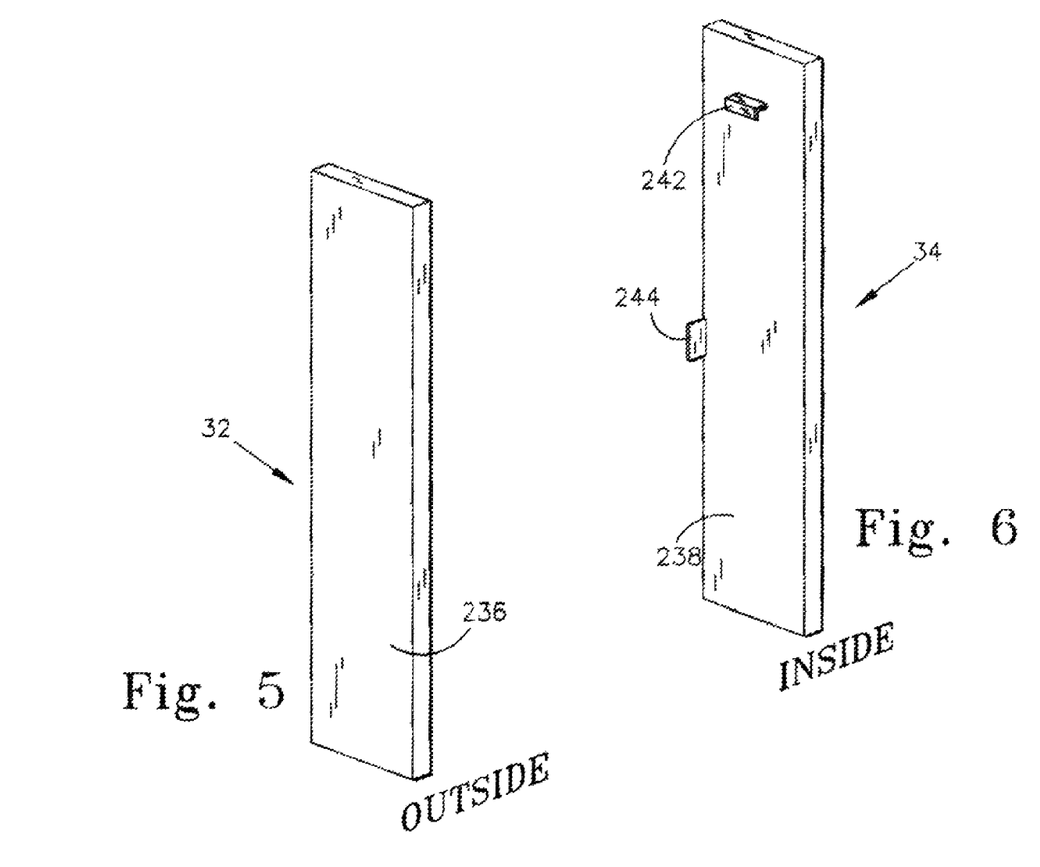
FIG. 5 is a front perspective view of a side frame member of the present invention showing the outwardly facing surface.
FIG. 6 is a front perspective view of a side frame member of the present invention showing an inwardly facing surface.

The picture frame system 26 of the present invention is best shown in connection with FIGS. 7, 8, 9, 10, 12A, 5 and 6. The picture frame system 26 includes a picture frame shaped picture frame 28, along with a first side frame member 32 (FIG. 5) and a second side frame member 34 (FIG. 6).

Figure 7:
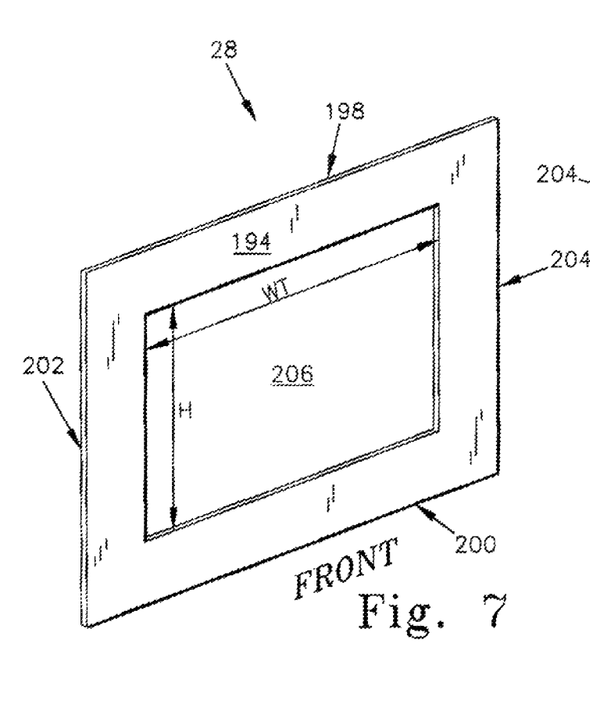
FIG. 7 is a front perspective view of a frame member of the present invention.
Figure 8:
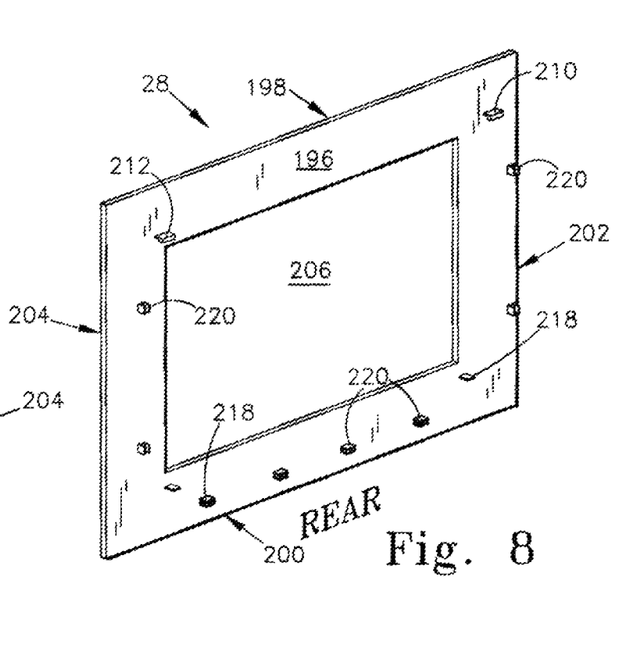
FIG. 8 is a rear perspective view the frame member of the present invention.

Turning first to the picture frame shaped frame 28, as best shown in FIGS. 7 and 8, the frame 28 includes a front surface 194 and a rear surface 196. The front surface 194 is placed outwardly for view, and the rear surface 196 is placed adjacent to, and in an opposed relation to the forwardly facing surface of the front panel 46 of the tank 12. The frame 28 is generally rectangular, and includes a first or upper leg 198, a second or lower leg 200, a first side leg 202 that extends generally between the first and second legs 198, 200; and a second side leg 204, that is disposed in a generally parallel relationship with the first side leg 202, and a generally perpendicular relationship with the upper and lower legs 198, 200.

The legs 198, 200, 202, 204 are joined together to form an open-centered rectangle, having an inner viewing space 206 having a width WI and a height HI. The area of the viewing area 206 should be slightly smaller than the area of the front panel 46, so that the top edge 58, bottom edge 60, first side edge 62, and second side edge 64 of the front panel are hidden behind the respective upper leg 198, lower leg 200, first side leg 202 and second side leg 204, so that the user viewing the tank 12 does not view any of the these edges, or for that matter, the upper mounting portion 80 of the rear panel 48. Preferably, the first leg 198 of the frame is wide enough to fully obscure the mounting portion 80 of the rear panel 40 and also obscure the mounting member 14, when a viewer views the frame 28 and tank 12 straight on.

The rear surface 196 of the frame includes first and second hook members 210, 212. The first and second hook members 210, 212 as shown in FIG. 12A, as including a laterally extending portion 214, and a downwardly extending portion 216. The laterally extending portion 214 fits over the top lip 58 of the front panel 46, and the downwardly extending portion 216 extends downwardly along the inner surface of the front panel 46. The hook members 210, 212 hook the frame onto the tank member 12 through the engagement of the hooks 210, 212 with the upper lip 58 of the tank member.

A lower, laterally extending guide member 218 is also formed on the rear surface 196 of the frame member. The laterally extending guide member 218 is sized and positioned to extend under, and engage the underside surface 219 of the bottom panel 50 of the tank 12.

The cooperative positioning of the laterally extending member 218 and the hook members 210, 212 helps to appropriately position the frame 28 on the tank 12, and helps to ensure that the frame 28 is placed in the appropriate position on the tank 12. Additionally, the engagement of the hook members 210, 212 and laterally extending member 218 serve to stabilize the frame 26 on the tank 12, so that under normal use conditions, the frame 28 will remain upon the tank 12, and not become disengaged therefrom. Nonetheless, the hook and laterally extending member 218 enable the frame 28 to be easily removed from the tank, should the user decide to replace the frame 28 with another, different frame, or should the user decide to remove the tank 12 from its engagement with the wall W.

A plurality of cord clips 220 are also unitarily formed as a part of frame 28 to extend laterally outwardly from the rear surface 196 of the frame 28. As shown in FIG. 12, the cord clips 220 should include a first prong 222, and a second prong 224. The prongs 222, 224 are spaced to accept a standard power cord there between to serve as a holder for the power cord.

The first and second side frame members 32, 34 are best shown in FIGS. 5 and 6. The side frame members 32, 34 include an exterior side surface 236 and an interior side surface 238. The interior side surface 238 is designed to be placed in an opposed relation with, and adjacent to the outer surface of the respective first and second side panels 52, 54. The side frame member 32, 34 should be sized to have about the same width as, and to be slightly taller than the side panel members 52, 54 of the tank 12, so that the side panel members 32, 34 can cover the entire side panels 52, 54 of the tank 12.

Although in practice, the side frame member 32, 34 are generally hidden from frontal view because they are positioned behind the first and second side legs 202, 204 of frame 28, side panel members do help to block the view of the tank from the side of the tank. Additionally, the side frame members 32, 34 also help to prevent stray light from entering the interior of the tank through the side panels 52, 54, which, when the tank is lit by light assembly 20, helps to improve the aesthetic appeal of the tank and its contents.

A hook member 242 is sized, configured and positioned for hooking over the upper lips 90, 104 of the first and second side panels 52, 54, to enable the side frame members 32, 34, to be secured to the tank 12. Lateral guide member 244 is formed on each of the first and second side frame members 32, 34 and is provided for properly positioning the side frame members 32, 34 with respect to the side panel members 52, 54 of the tank.

The tank system 10 is also designed to accept a light assembly 20 and filter assembly 24 in a manner and in a position that permits the light 20 and filter 24 to serve their intended functions while at least partially obscuring the light 20 and filter 24 so as to not enable the light 20 or filter 24 to detract too much from the aesthetic appearance of the device 10.

As best shown in FIGS. 1A and 9, the light assembly 20 is attachable to the tank 12 by an L-shaped bracket 22. The L-shaped bracket 22 includes a first set of apertures 250 through which a fastener 21 can pass, for fastening the bracket 22 to mating female threaded apertures (not shown) that are formed in the upper surface of the housing 252 of the lamp. Preferably, the threaded apertures are placed on the housing surface opposite to the surface in which the lens 254 of the light is disposed. A second set of apertures 256 are provided through which second fasteners 23 can pass. Second fasteners 23 pass not only through aperture 256, but also through apertures 84, in a mounting portion of the tank, for securing the bracket 22 and hence the light assembly onto the mounting portion 116 of the rear panel 48 of the tank 12.

The light assembly also includes a power cord 260 that terminates at a plug 262 for supplying AC power to the light.

The filter 24 has a housing that can include a plurality of suction members such as suction cup member 264 to enable the filter 24 to adhere to an inner surface of the tank 12. Filter member 24 also includes a power cord 268 that terminates at a plug 270 for providing AC power to the filter to enable the filter to operate.

As best shown in FIG. 9, the power cord 260, 268 of light assembly 20 and filter 24 are preferably extended through the cord clips 220 of the frame 28 to keep the power cords out of the view of the user. Although in FIG. 9 the power cords are shown as terminating behind the frame 28, it will be appreciated that in most circumstances, the cords will extend along the bottom leg 200 of the frame, and will then extend downwardly there from (in an exposed view) until they reach an appropriate plug or power strip.

It should also be noted that variations can exist in the dimensions of employed for the instant invention. Further, although the tank 12 is preferably made as a unilarily molded, one piece unit, the tank can be made as a two-piece unit (e.g. FIGS. 13 and 14) or a multi-piece unit. Further, the shape of the frame can vary. For example, a frame with an outwardly bowed front panel, and an accompanying curvi-linear frame may have an aesthetic appeal to users.

Although the invention has been described in detail with reference to certain preferred embodiments, it will be appreciated that variations and modifications exist within the scope and spirit of the present invention, as defined by the appended claims and their permissible equivalence.

What is claimed is:

1. A wall mountable tank system for holding live flora or fauna comprising:
   a tank defined by a rear panel having a rear panel height, a front panel having a front panel height, a first side panel having a first side panel height, a second side panel having a second side panel height, and a bottom panel, all of the panels defining a tank interior for containing the flora or fauna with the front panel height, the first side panel height and the second side panel height having the same height with the rear panel height greater than the height of the front, first side and second side panels, the rear panel having a mounting portion formed as part of and at a top end of the rear panel above the height of the front panel, the first side panel, and the second side panel, the mounting portion extending along the top end of the rear panel from a first side of the top end of the rear panel that is adjacent the first side panel to a second side of the top end of the rear panel that is adjacent the second side panel and having a thickness that is at least twice as thick as a thickness of the rear panel, the mounting portion having a downwardly opening, outwardly beveled receiving groove on a lower surface thereof, the beveled receiving groove extending from the first side of the top end of the rear panel to the second side of the top end of the rear panel, and having a first upwardly extending receiving slot disposed in an upper surface of the beveled receiving groove proximate the first side of the top end of the rear panel and a second upwardly extending receiving slot disposed in the upper surface of the beveled receiving groove proximate the second side of the top end of the rear panel; and
   a mounting member capable of being fixedly coupled to a vertical mounting surface, the mounting member including a longitudinal tongue portion receivable in the beveled receiving groove of the mounting portion for engaging the tank to the mounting member, and a first tab extending upwardly from the longitudinal tongue portion and sized and positioned for reception in the first receiving slot of the beveled receiving groove and a second tab extending upwardly from the longitudinal tongue portion and sized and positioned for reception in the second receiving slot of the beveled receiving groove, the engagement of the first and second tabs in the first and second receiving slots of the beveled receiving groove serving to substantially prevent lateral movement of the mounting portion relative to the longitudinal tongue member.

2. The wall mountable tank system of claim 1, wherein the mounting member comprises an elongate strip-like member having a plurality of fastener-receiving apertures through which fasteners can pass for securing the mounting member to the vertical mounting surface.

3. The wall mountable tank system of claim 2, wherein the strip-like member comprises a rigid plastic elongate strip-like member, the wall mountable tank system further comprising fasteners sized and configured for passing through the fastener receiving apertures and engaging the vertical mounting surface.

4. The wall mountable tank system of claim 1, further comprising a light assembly coupled to the mounting portion for illuminating the interior of the tank.

5. The wall mountable tank system of claim 4, wherein the mounting portion includes a light assembly mounting aperture, the light assembly includes a mounting bracket having a mounting bracket aperture, and further comprising a fastener sized and configured for passing through the light assembly mounting aperture and the mounting bracket aperture for fixedly coupling the light assembly to the mounting portion.

6. The wall mountable tank system of claim 5, further comprising:
a frame assembly configured for releasable coupling to the tank.

7. The wall mountable tank system of claim 6, wherein the frame assembly comprises:
a unitary picture-frame shaped frame defined by an upper frame leg, a lower frame leg, a first side frame leg, and a second side frame leg, the upper frame leg having rear surface hook members configured to rest upon an upper edge of the front panel of the tank, and the lower frame leg having a rear surface with lateral members configured to extend under a lower edge of the front panel, the hook members and the lateral members for aiding in maintaining the picture frame-shaped frame in a proper position on the tank.

8. The wall mountable tank system of claim 7, wherein the first side frame leg has a rear surface with a plurality of cord clips defined by laterally extending prongs.

9. The wall mountable tank system of claim 8, further comprising:
a first side framing member configured for releasable attachment to the first side panel of the tank; and
a second side framing member configured for releasable attachment to the second side panel of the tank.

10. The wall mountable tank system of claim 9, wherein:
the first side framing member has a hook member on an inside surface that is configured to rest upon an upper edge of the first side panel of the tank, and a lateral guide member extending from the inside surface that is configured to extend over a rear surface of the rear panel of the tank; and
the second side framing member has a hook member on an inside surface that is configured to rest upon an upper edge of the second side panel of the tank, and a lateral guide member extending from the inside surface that is configured to extend over the rear surface of the rear panel of the tank.

11. The wall mountable tank system of claim 10, further comprising:
a picture holder for holding a picture flushly against a backside of the rear panel.

12. The wall mountable tank system of claim 11, wherein the picture holder includes the mounting member that is adjacent to a rear surface of the rear panel for engaging a first edge of a picture held by the picture holder, and a lower picture holding member extending from a bottom end of the rear panel for engaging a second edge of the picture held by the picture holder.

13. A wall mountable tank system for holding live flora or fauna comprising:
a tank defined by a rear panel having a rear panel height, a front panel having a front panel height, a first side panel having a first side panel height, a second side panel having a second side panel height, and a bottom panel, all of the panels defining a tank interior for containing the flora or fauna with the front panel height, the first side panel height and the second side panel height having the same height with the rear panel height greater than the height of the front, first side and second side panels, the rear panel having a mounting portion formed as part of and at a top end of the rear panel, the mounting portion extending along the top end of the rear panel from a first side of the top end of the rear panel that is adjacent the first side panel to a second side of the top end of the rear panel that is adjacent the second side panel and having a thickness that is at least twice as thick as a thickness of the rear panel and having a downwardly opening, outwardly beveled receiving groove on a lower surface thereof, the beveled receiving groove extending from the first side of the top end of the rear panel to the second side of the top end of the rear panel, and having a first upwardly extending receiving slot disposed in an upper surface of the beveled receiving groove proximate the first side of the top end of the rear panel and a second upwardly extending receiving slot disposed in the upper surface of the beveled receiving groove proximate the second side of the top end of the rear panel;
a mounting member capable of being fixedly coupled to a vertical mounting surface for mounting the tank to the vertical mounting surface, the mounting member including a generally beveled shaped longitudinal tongue portion receivable in the beveled receiving groove of the mounting portion for engaging the tank to the mounting portion, and a first tab extending upwardly from the longitudinal tongue portion and a second tab extending upwardly from the longitudinal tongue portion, the first and second tabs being sized and positioned for reception in respective first and second receiving slots, the engagement of the first and second tabs in the first and second receiving slots serving to substantially prevent lateral movement of the tongue portion relative to the groove portion; and
a unitary picture frame-shaped frame releasably coupled to the tank.

14. The wall mountable tank system of claim 13, wherein the unitary picture frame-shaped frame includes a hook member on an inside surface that is rests upon an upper edge of the front panel for securing the picture frame-shaped frame to the tank.

15. The wall mountable tank system of claim 14, wherein the unitary picture frame-shaped frame includes a lower guide for engaging the bottom panel of the tank for aiding in positioning the picture frame-shaped frame on the tank.

16. The wall mountable tank system of claim 15, further comprising a plurality of cord clips disposed on a rear surface of the unitary picture frame-shaped frame for holding electrical cords.

17. The wall mountable tank system of claim 16, wherein the unitary picture frame-shaped frame includes a first leg, and the wall mountable tank system further comprising a light assembly capable of being coupled to the tank and positioned behind the first leg of the picture frame-shaped frame, wherein the first leg of the unitary picture frame-shaped frame has a width that is wide enough to conceal the light assembly, and wherein the light assembly includes an electrical cord capable of being clipped to the plurality of cord clips.

18. The wall mountable tank system of claim 17, further comprising a filter capable of being coupled to the mounting portion for filtering water contained within the interior of the tank and positioned behind the first leg of the picture frame-shaped frame, wherein the first leg of the unitary picture frame-shaped frame has a width that is wide enough to conceal the filter, and wherein the filter includes an electrical cord capable of being clipped to the plurality of cord clips.

19. The wall mountable tank system of claim 18, further comprising first and second side framing members configured for coupling to the tank, the first side framing member being disposed in a plane generally perpendicular to a plane in which the picture frame-shaped frame is disposed, and being positioned adjacent to the first side panel of the tank, and the second side framing member being disposed in a plane generally parallel to the first side framing member, and being positioned adjacent to the second side panel of the tank.

20. The wall mountable tank system of claim 19, wherein:
the first side framing member has a hook member on an inside surface that is configured to rest upon an upper edge of the first side panel of the tank, and a lateral guide member extending from the inside surface that is configured to extend over a rear surface of the rear panel of the tank; and
the second side framing member has a hook member on an inside surface that is configured to rest upon an upper edge of the second side panel of the tank, and a lateral guide member extending from the inside surface that is configured to extend over the rear surface of the rear panel of the tank.

* * * * *